(12) United States Patent
Weijnen et al.

(10) Patent No.: US 9,045,665 B2
(45) Date of Patent: Jun. 2, 2015

(54) SOLVENT BORNE COATING COMPOSITION

(75) Inventors: John Weijnen, Alphen aan den Rijn (NL); Ton Van Den Berg, Oegstgeest (NL)

(73) Assignee: PPG EUROPE B.V., Uithoorn (NL)

( * ) Notice: Subject to any disclaimer, the term of this patent is extended or adjusted under 35 U.S.C. 154(b) by 68 days.

(21) Appl. No.: 13/256,755

(22) PCT Filed: Mar. 16, 2010

(86) PCT No.: PCT/EP2010/053324
§ 371 (c)(1),
(2), (4) Date: Sep. 15, 2011

(87) PCT Pub. No.: WO2010/106033
PCT Pub. Date: Sep. 23, 2010

(65) Prior Publication Data
US 2012/0010344 A1  Jan. 12, 2012

(30) Foreign Application Priority Data
Mar. 17, 2009 (EP) .................................. 09155357

(51) Int. Cl.
*C09F 9/00* (2006.01)
*C09D 167/08* (2006.01)
*C08K 5/098* (2006.01)

(52) U.S. Cl.
CPC ................ *C09D 167/08* (2013.01); *C09F 9/00* (2013.01); *C08K 5/098* (2013.01)

(58) Field of Classification Search
CPC ................................ C09F 9/00; C09D 167/08
USPC ................................... 524/398; 106/264, 310
IPC ......................................................... C09F 9/00
See application file for complete search history.

(56) References Cited

U.S. PATENT DOCUMENTS

| | | | |
|---|---|---|---|
| 3,901,837 A | | 8/1975 | Gottesman et al. |
| 5,154,764 A | * | 10/1992 | Cells et al. .................... 524/89 |
| H0001386 H | * | 12/1994 | Testa et al. .................... 525/437 |
| 6,075,088 A | * | 6/2000 | Braeken ........................ 524/590 |

FOREIGN PATENT DOCUMENTS

| | | | |
|---|---|---|---|
| EP | 304149 A | * | 2/1989 |
| GB | 2019865 A | * | 11/1979 |
| WO | WO 98/22543 | | 5/1998 |
| WO | WO 03/020791 | | 3/2003 |
| WO | WO 2007/017032 | | 2/2007 |
| WO | WO 2007/075296 | | 7/2007 |

OTHER PUBLICATIONS

The definition of soap (IUPAC. Compendium of Chemical Terminology, 2nd ed. (the "Gold Book"). Compiled by A. D. McNaught and A. Wilkinson. Blackwell Scientific Publications, Oxford, 1997, 1 page).*
Reichhold (Beckosol 10-539 Product Bulletin, Reichhold, Mar. 2001, 4 pages).*
International Search Report dated Jun. 23, 2010 issued to international application PCT/EP2010/053324.

* cited by examiner

*Primary Examiner* — Brieann R Fink
(74) *Attorney, Agent, or Firm* — Knobbe, Martens, Olson & Bear, LLP

(57) ABSTRACT

The present invention relates to a solvent borne coating composition that comprises an autoxidizable film-forming alkyd binder and a drier system for the autoxidation of the binder, wherein the drier system comprises: (a) at least 0.001 wt % metal, based on binder solids, of at least one metal salt of an organic acid wherein the metal is selected from the group consisting of V, Ce, or Fe; (b) at least 0.01 wt % metal, based on binder solids, of at least one Co salt of an organic acid; and (c) at least 0.01 wt % metal, based on binder solids, of at least one metal salt of an organic acid wherein the metal is selected from the group consisting of Ca, Zn, Ba, K or Li.

14 Claims, No Drawings

SOLVENT BORNE COATING COMPOSITION

CROSS-REFERENCE TO RELATED APPLICATIONS

This application is the U.S. National Phase under 35 U.S.C. §371 of International Application PCT/EP2010/053324, filed Mar. 16, 2010, which claims priority to EP 09155357.8, filed Mar. 17, 2009.

FIELD OF THE INVENTION

The present invention relates to a solvent borne coating composition that comprises an autoxidizable film-forming alkyd binder and a drier system for the autoxidation of the binder.

BACKGROUND OF THE INVENTION

Autoxidizable alkyds are long-established binders for film-forming coating compositions acknowledged for their esthetical properties, a low surface tension, which enables the wetting of and adhesion on a wide variety of substrates and facilitates pigment wetting, can be applied by various techniques, and are cost-effective.

The environmental burden and health problems caused by solvent emission imposes the development of coating formulations containing little or no volatile organic compound (VOC) content. However, while the move to reduced organic solvent-based compositions brings health and safety benefits, these lower VOC content alkyd coating compositions must still meet or exceed the performance standards expected from solvent-based compositions. Such efforts by the coatings industry has resulted in the development of a number of high-solids resin coating formulations which contains significantly reduced amounts of solvents, and, in some instances, little or no solvent.

Alkyd resins generally require transition metal soaps which act as driers, particularly a cobalt soap, in combination with a zirconium soap, to catalyze the polymerization of drying oils used in such resin compositions. However, many of the drier catalysts which have been useful as driers for conventional solvent based coating formulations are observed to be inadequate when used in high-solids coating formulations. High solid alkyd resins have relatively long "dry" and/or cure times, particularly at ambient temperatures or cold temperatures.

In addition, while the metal soaps perform quite effectively when they are first compounded in such coating compositions, these compositions in a formulation having high solids content, often exhibit a reduction in drying rate on aging, compared to conventional solids formulations. For example, when an alkyd paint is highly pigmented, a phenomenon often occurs which has been called "loss of dry"—that is, the alkyd paint does not dry as rapidly after prolonged storage as when first prepared. For example, a paint which may dry in 4 hours when first prepared, may require 6 to 8 hours or longer for drying after 30 days of storage.

It has been suggested that the reduction in the drying rate results from an adsorption of the metal soaps on the surface of pigment particles and extenders used in the coating composition, or possibly by a reaction between the metal soaps and other coating constituents that produce insoluble, and inactive metal compounds. Whatever the reason, the reduction in the drying rate of such coating compositions is generally considered a disadvantage.

Certain "loss of dry" inhibitors have been available in the prior art. U.S. Pat. No. 3,901,837, for example, describes a solution of a mixture of cobalt, calcium and zinc, or zirconium, oil-soluble metal salts (soaps) as a loss-of-dry inhibitor. U.S. Pat. No. 3,972,825 describes loss-of-dry inhibitors comprising metal salt solutions that contain cobalt, calcium, and zinc or zirconium. WO98/53018 describes a composition comprising a reaction product of an oil soluble cobalt soap and an oil soluble over-based calcium soap which serves as a "loss of dry" inhibitor. The loss-of-dry inhibitors function to counteract the loss of activity observed when using the conventional metal soaps, but none has proven to be entirely satisfactory.

There remains a need in the market to further improve the surface dry time of low VOC alkyd based coating compositions to a very low level, in particular at room or low temperatures, and to minimize or prevent the loss of drying rate on aging of alkyd based-coating compositions. It is accordingly one of the objects of the present invention to overcome or ameliorate at least one of the disadvantages of the prior art, or to provide a useful alternative.

SUMMARY OF THE INVENTION

It has now been found that the loss of drying rate on aging of solvent borne alkyd based-coating compositions can be minimized or prevented by incorporating in the compositions a specific combination of metal driers.

The present invention relates to a coating composition comprising at least one autoxidizable alkyd binder and a drier system, wherein the drier system comprises:

a) at least 0.001 weight % (wt %) metal, based on binder solids, of at least one metal salt of an organic acid wherein the metal is selected from the group consisting of V, Ce, or Fe;

b) at least 0.01 wt % metal, based on binder solids, of at least one Co salt of an organic acid;

c) at least 0.01 wt % metal, based on binder solids, of at least one metal salt of an organic acid wherein the metal is selected from the group consisting of Ca, Zn, Ba, K or Li;

and wherein said composition is a solvent borne coating composition.

The present invention also relates to a substrate having applied thereon a cured coating composition according to the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION

The present invention relates to a solvent borne coating composition that comprises at least one autoxidizable alkyd film-forming resinous vehicle (binder) and a drier system for the autoxidation of the resinous vehicle wherein the drier system comprises a) at least 0.001 wt % metal, based on binder solids, of at least one metal salt of an organic acid wherein the metal is selected from the group consisting of V, Ce, or Fe; preferably the metal is selected from the group consisting of V, and Ce, most preferably the metal V;

b) at least 0.01 wt % metal, based on binder solids, of at least one Co salt of an organic acid;

c) at least 0.01 wt % metal, based on binder solids, of at least one metal salt of an organic acid wherein the metal is selected from the group consisting of Ca, Zn, Ba, K or Li; preferably the metal is selected from the group consisting of Ca, Zn, or Li, more preferably the metal is Ca or Zn, yet more preferably the metal is Ca; and d) optionally at least 0.01 wt % metal, based on binder solids, of at least one metal salt of an organic acid wherein the metal is selected from the group consisting of Zr, Sr, Al, Bi, La, and Nd; preferably the metal is selected from the group consisting of Zr, Sr, Nd, or La, more preferably the metal is Zr, Sr, or Nd, yet more preferably the metal is Zr or Sr, preferably Zr.

When describing the compositions of the invention, the terms used are to be construed in accordance with the following definitions, unless a context dictates otherwise.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. Any numerical range recited herein is intended to include all sub-ranges subsumed therein.

As used in the specification and the appended claims, the singular forms "a", "an," and "the" include plural referents unless the context clearly dictates otherwise. By way of example, "a binder" means one binder or more than one binder.

As used herein, the term "solvent-borne coating composition" refers to a composition that utilizes one or more volatile organic materials as the primary dispersing medium. According to an embodiment, the coating compositions of the present invention are substantially free of water, or, in some cases, completely free of water. As used herein, the term "substantially free" means that the material being discussed is present in the composition, if at all, as an incidental impurity. In other words, the material does not affect the properties of the composition. As used herein, the term "completely free" means that the material being discussed is not present in the composition at all. In certain embodiments, the amount of water present in the coating compositions of the present invention is less than 25 wt %, such as less than 20 wt %, such as less than 15 wt %, such as less than 10 wt %, such as less than 5 wt %, or, in some cases, less than 2 wt %, or, in yet other cases, less than 1 wt %, with the wt % being based on the total weight of the coating composition. The amount of water should remain lower than 25 wt % such that the alkyd binder remains in the continuous phase.

According to the invention, the present composition comprises at least one autoxidizable alkyd binder.

As used herein the term "alkyd binder" or "alkyd resin" are used interchangeably. Suitable autoxidizable alkyd resin for use in the invention, are in general the reaction product of the esterification of polyhydric alcohols with polybasic acids (or their anhydrides) and unsaturated fatty acids (or glycerol esters thereof), for example derived from linseed oil, tung oil, tall oil as well as from other drying or semi-drying oils. Alkyd resins are well-known in the art and need not to be further described herein. The properties are primarily determined by the nature and the ratios of the alcohols and acids used and by the degree of condensation. Suitable alkyd resins include long oil and medium oil alkyd resins e.g. derived from 45 to 70 wt. % of fatty acids. To improve the performance of the resins, the composition of the long oil and medium oil alkyd may be modified. For example, polyurethane modified alkyds, silicone modified alkyds, styrene modified alkyds, acrylic modified alkyds (e.g. (meth)acrylic modified alkyds), vinylated alkyds, polyamide modified alkyds, and epoxy modified alkyd or mixture thereof are also suitable alkyd resins to be used in the present composition.

Preferably, said at least one autoxidizable alkyd binder is selected from a medium or long oil unmodified alkyd, a silicone modified alkyd, a polyurethane modified alkyd or a combination thereof. Most preferably, said alkyd binder is a long oil (unmodified) alkyd, a silicone modified alkyd, a polyurethane modified alkyd or a combination thereof.

The amount of alkyd binder in the present compositions can typically range from about 20 to 98 wt %, such as about 30 to about 90 wt %, preferably about 40 to 70 wt % based on the total weight of the composition.

The coating composition according to the invention comprises a drier system. The present inventors have found that the present selection of driers in the drier system of the coating composition improves the low temperature drying of the present composition. In addition the drier system used in the present composition helps to minimize or prevent the loss-of-dry on aging and improves the through drying of the present compositions.

As used herein the terms "drier" or "drier systems" (which are also referred to as "siccatives") refer to organometallic compounds soluble in organic solvents and binders. Chemically they belong to the class of soaps and they are added to unsaturated oils and binders in order to appreciably reduce their drying times, i.e. the transition of their films to the solid phase. Driers are available either as solids or in solution. Suitable solvents are organic solvents and binders. The driers in the drier system are present in amounts expressed as weight percent of the metal based on the weight of binder solids (or resin).

The drier system for use in the present invention comprises:

a) at least 0.001 wt % metal, based on binder solids, of at least one primary drier selected from the group consisting of V, Ce, and Fe driers;

b) at least 0.01 wt % metal, based on binder solids, of at least one Co drier;

c) at least 0.01 wt % metal, based on binder solids, of at least one secondary drier selected from the group consisting of Ca, Zn, Ba, K or Li driers; and d) optionally at least 0.01 wt % metal, based on binder solids, of at least one coordination drier selected from the group consisting of Zr, Sr, Al, Bi, La, and Nd driers.

As used herein the term "primary driers", which are also referred to as "oxidative driers", "catalytic driers", "top driers", "surface driers", and "active driers" refers to soaps of metals which exist in at least two accessible valence states and undergo redox reactions during the curing process. Primary driers promote deactivation of natural occurring anti-oxidants, oxygen uptake, peroxide formation and peroxide decomposition. According to the present invention, the composition comprises at least two primary driers.

As used herein the term "co-ordination driers", is also referred to synonymously as "cross linking driers", "through driers", "polymerizing driers". Co-ordination driers promote the film-forming process by interaction with the carboxyl and hydroxyl groups in the polymeric binder. This way, co-ordination driers can bridge two or more polymer chains. These carboxyl and hydroxyl groups may be initially present in the binder molecule or formed during the autoxidation process. This group comprises the metal driers: Zr, Sr, Al, Bi, La, and Nd.

As used herein the term "secondary driers" is also referred to synonymously as "auxiliary driers". These metal driers exist in a single oxidation state and are not catalytic active by themselves but do affect the rate-of-dry by interacting with the primary driers. Secondary driers include Ca, Ba, K and Li metal soaps.

As used herein the term "metal soap" or "soap" refers to a metal salt of an organic acid, preferably of a monocarboxylic acid, especially those acids commonly referred to as fatty acids. Useful acids include saturated and unsaturated aliphatic, aromatic and alicyclic monocarboxylic acids, for example, hexanoic acid, n-octanoic acid, 2-ethylhexanoic acid, nonanoic acid, isononanoic acid, decanoic acid, isodecanoic acid, neodecanoic acid, lauric acid, myristic acid, stearic acid, arachidic acid, behenic acid, oleic acid, linoleic acid, tall oil fatty acid, erucic acid, p-tert-butylbenzoic acid, monobutyl maleate, monodecyl phthalate, naphthenic acid, cyclopentanoic acid, cyclohexanoic acid, cycloheptanoic acid, and methylcyclohexanoic acid and mixtures thereof. In certain embodiments, metal soaps of branched-chain aliphatic monocarboxylic acids having 6 to 22 carbon atoms or aromatic or alicyclic monocarboxylic acids having 6 to 24 carbon atoms are used. Preferably, metal octoate, octanoate, neodecanoate, or naphthenate are used.

In an embodiment, the drier system in said composition additionally further comprises at least 0.01 wt % metal, based on binder solids, of at least one metal salt of an organic acid wherein the metal is selected from the group consisting of Zr, Sr, Al, Bi, La, and Nd.

Preferably said drier system additionally comprises from 0.01 wt % to 2 wt % metal, based on binder solids, of at least one metal salt of an organic acid wherein the metal is selected from the group consisting of Zr, Sr, Al, Bi, La, and Nd; preferably the metal is selected from the group consisting of Zr, Sr, Nd, and La, most preferably the metal is selected from the group consisting of Zr, and Sr, yet most preferably the metal is Zr.

One embodiment of the present invention concerns a coating composition wherein the drier system comprises/a)

a) at least 0.001 wt % metal, based on binder solids, of at least one metal salt of an organic acid wherein the metal is selected from the group consisting of V, Ce, or Fe;

b) at least 0.01 wt % metal, based on binder solids, of at least one Co salt of an organic acid;

c) at least 0.01 wt % metal, based on binder solids, of at least one metal salt of an organic acid wherein the metal is selected from the group consisting of Ca, Zn, Ba, K or Li; and d) at least 0.01 wt % metal, based on binder solids, of at least one metal salt of an organic acid wherein the metal is selected from the group consisting of Zr, Sr, Al, Bi, La, and Nd.

One embodiment of the present invention concerns a coating composition wherein the drier system comprises a) from 0.001 wt % to 2 wt %, preferably from 0.01 wt % to 1.0 wt %, more preferably from 0.02 to 0.4 wt % metal, based on binder solids, of at least one metal salt of an organic acid wherein the metal is selected from the group consisting of V, Ce, or Fe;

b) from 0.01 wt % to 2 wt %, preferably from 0.02 wt % to 0.5 wt %, more preferably from 0.03 to 0.3 wt %, metal, based on binder solids, of at least one Co salt of an organic acid;

c) from 0.01 wt % to 2 wt %, preferably from 0.1 wt % to 1.5 wt %, more preferably from 0.2 to 1.0 wt %, metal, based on binder solids, of at least one metal salt of an organic acid wherein the metal is selected from the group consisting of Ca, Zn, Ba, K or Li.

In an embodiment, the drier system comprises a) from 0.001 wt % to 2 wt % metal, based on binder solids, of at least one Ce salt of an organic acid, b) from 0.01 wt % to 2 wt % metal, based on binder solids, of at least one Co salt of an organic acid; and c) from 0.01 wt % to 2 wt % metal, based on binder solids, of at least one metal salt of an organic acid wherein the metal is selected from the group consisting of Ca, Zn, Ba, K or Li, and optionally at least 0.01 wt % to 2 wt % metal, based on binder solids, of at least one metal salt of an organic acid wherein the metal is selected from the group consisting of Zr, Sr, Al, Bi, La, and Nd.

In another embodiment, the drier system comprises a) from 0.001 wt % to 2 wt % metal, based on binder solids, of at least one Fe salt of an organic acid, b) from 0.01 wt % to 2 wt % metal, based on binder solids, of at least one Co salt of an organic acid; and c) from 0.01 wt % to 2 wt % metal, based on binder solids, of at least one metal salt of an organic acid wherein the metal is selected from the group consisting of Ca, Zn, Ba, K or Li, and optionally at least 0.01 wt % to 2 wt % metal, based on binder solids, of at least one metal salt of an organic acid wherein the metal is selected from the group consisting of Zr, Sr, Al, Bi, La, and Nd.

Preferably, the drier system comprises a) from 0.001 wt % to 2 wt %, preferably from 0.01 wt % to 1.0 wt %, more preferably from 0.02 to 0.4 wt % metal, based on binder solids, of at least one V salt of an organic acid, b) from 0.01 wt % to 2 wt %, preferably from 0.02 wt % to 0.5 wt %, more preferably from 0.03 to 0.3 wt % metal, based on binder solids, of at least one Co salt of an organic acid; and c) from 0.01 wt % to 2 wt %, preferably from 0.1 wt % to 1.5 wt %, more preferably from 0.2 to 1.0 wt % metal, based on binder solids, of at least one metal salt of an organic acid wherein the metal is selected from the group consisting of Ca, Zn, Ba, K or Li, and optionally at least 0.01 wt % to 2 wt %, preferably from 0.1 wt % to 1.5 wt %, more preferably from 0.4 to 1.2 wt %, metal, based on binder solids, of at least one metal salt of an organic acid wherein the metal is selected from the group consisting of Zr, Sr, Al, Bi, La, and Nd.

Preferably, the drier system comprises at least one Co salt of an organic acid; at least one V salt of an organic acid; and at least one Ca salt of an organic acid and optionally the drier system further comprises at least one Zr salt of an organic acid.

In a preferred embodiment, the drier system in said coating composition comprises a) from 0.001 wt % to 2 wt % metal, based on binder solids, of at least one V salt of an organic acid, b) from 0.01 wt % to 2 wt % metal, based on binder solids, of at least one Co salt of an organic acid; and c) from 0.01 wt % to 2 wt % metal, based on binder solids, of at least one Ca salt of an organic acid.

In a preferred embodiment, the drier system in said coating composition comprises a) from 0.001 wt % to 2 wt % metal, based on binder solids, of at least one V salt of an organic acid, b) from 0.01 wt % to 2 wt % metal, based on binder solids, of at least one Co salt of an organic acid; c) from 0.01 wt % to 2 wt % metal, based on binder solids, of at least one Ca salt of an organic acid; and d) from 0.01 wt % to 2 wt % metal, based on binder solids, of at least one Zr salt of an organic acid.

Examples of suitable cobalt salt of an organic acid include, but are not limited to, cobalt carboxylates such as cobalt neodecanoates, cobalt isononate, cobalt tallates, cobalt linoleates, cobalt octoates, cobalt naphthenates, and cobalt boroacylates. Such cobalt driers are available from the OM Group, Inc., and include cobalt Ten-Cem@, cobalt Cem-All@, cobalt Hex-Cem@, cobalt Nap-All, Cobalt Lin-All®, and Ultra-Dri® 360D.

Examples of suitable vanadium salt of an organic acid include, but are not limited to, vanadium carboxylates such as vanadium neodecanoate, vanadium octoate, vanadium naphthenate; such as Cur-Rx E® (from the OM Group, Inc. CAS nr: 60451-07-2); drier Cur-Rx® (from the OM Group, Inc.); Borchers VP 0132; Dura DriCAT 3 (CAS nr: 68553-60-6); or Shepherd Vanadium 3% (CAS nr: 68553-60-6).

Examples of suitable calcium salt of an organic acid include, but are not limited to, calcium carboxylates such as calcium neodecanoates, calcium octoates, calcium tallates, calcium linoleates, and calcium naphthenates. Such calcium driers are available from the OM Group, Inc., and include calcium Ten-Cem@, calcium Cem-All@, calcium Hex-Cem@, and calcium Nap-All.

Examples of suitable zirconium salt of an organic acid include, but are not limited to, zirconium carboxylates such as zirconium neodecanoates, zirconium octoates, and zirconium naphthenates. Such zirconium driers are available from the OM Group, Inc., and include zirconium Hex-Cem@.

In certain embodiments, the solvent-borne coating composition of the present invention further comprises at least one complexing agent or neutral ligands. Suitable complexing agents include but are not limited to 2,2-bipyridyl, imidazoles, pyrazoles, aliphatic and aromatic amines, 1,10-phenanthroline, 5-methyl-1,10-phenanthroline, 1,4,7-trimethyl-1,4,7-tri-azacyclononane, and the like.

In certain embodiments, the solvent-borne coating composition of the present invention further comprises anti-skinning agents and anti-oxidants such as but not limited to methyl ethyl ketoxime, n-butyl ketoxime, cyclohexane ketoxime, methyl isobutyl ketoxime, di-methyl ketoxime, 2-cyclohexylphenol, 4-cyclohexylphenol, mono-tertiary butylhydroquinone, diethyl hydroxylamine, and 2-[(1-methylpropyl)amino]ethanol and the like.

As indicated, the solvent-borne coating compositions of the present invention can utilize one or more volatile organic materials as the primary dispersing medium.

The metal drier combinations and optionally colorants, pigments and extenders and optionally other additives may be formulated into solvent-borne coating compositions by mixing and, if appropriate, dispersing and grinding with the liquid binder.

As used herein, the term "volatile organic material" refers to any organic compound having an initial boiling point less than or equal to 250° C. measured at a standard pressure of 101.3 kPa). As used herein, the term "organic compound" refers to any compound containing at least the element carbon and one or more of hydrogen, oxygen, sulfur, phosphorus, silicon, nitrogen, or a halogen, with the exception of carbon oxides and inorganic carbonates and bicarbonates.

Such materials are often included in coating compositions to reduce the viscosity of the composition sufficiently to enable forces available in simple coating techniques, such as spraying, to spread the coating to controllable, desired and uniform thicknesses. Also, such materials may assist in substrate wetting, resinous component compatibility, package stability and film formation. Non-limiting examples of suitable volatile organic materials (also referred as solvent) for use in the present composition include aliphatic, cycloaliphatic and aromatic hydrocarbons, such as hexane, heptane, octane, isooctane, cyclohexane, cycloheptane, toluene and xylene; isoparafins; ketones, such as methyl ethyl ketone and methyl isobutyl ketone; alcohols, such as isopropyl alcohol, normal-butyl alcohol and normal-propyl alcohol; monoethers of glycols, such as the monoethers of ethylene glycol and diethylene glycol; monoether glycol acetates, such as 2-ethoxyethyl acetate; as well as compatible mixtures thereof. As examples of such solvents may be mentioned hydrocarbon solvents available under the trademarks ShellIsol H, ShellIsol K, ShellIsol D40, ShellIsol D60, ShellIsol D70, and ShellIsol AB, all from Shell Chemicals, the Netherlands, the trademarked Solvesso 150 solvent from Esso and also: Exxsol D40, Exxsol D60 and Exxsol D80, and solvents such as ethyl diglycol, ethyl glycol acetate, butyl glycol, butyl glycol acetate, butyl diglycol, butyl diglycol acetate, and methoxypropylene glycol acetate. In certain embodiments, the volatile organic material is present in the coating compositions of the present invention in amounts of about 5 wt % to about 45 wt %, preferably about 10 wt % to about 45 wt %, preferably about 20 wt % to about 40 wt %, preferably 25 wt % to about 35 wt %, based on the total weight of the coating composition.

The present invention also relates to coating compositions having a VOC content below 400 g/L preferably below 300 g/L, more preferably below 225 g/l, and preferably below 200 g/l.

In certain embodiments, the solvent-borne coating compositions of the present invention comprise at least one colorant. The colorant component of the coating composition may comprise one or more inorganic or organic, transparent or non-transparent pigments. Non-limiting examples of such pigments are titanium dioxide, iron oxides, mixed metal oxides, bismuth vanadate, chromium oxide green, ultramarine blue, carbon black, lampblack, monoazo and disazo pigments, anthraquinones, isoindolinones, isoindolines, quinophthalones, phthalocyanine blues and greens, dioxazines, quinacridones and diketo-pyrrolopyrroles; and extender pigments including ground and crystalline silica, barium sulfate, magnesium silicate, calcium silicate, mica, micaceous iron oxide, calcium carbonate, zinc oxide, aluminum hydroxide, aluminum silicate and aluminum silicate, gypsum, feldspar, talcum, kaolin, and the like. The amount of pigment that is used to form the coating composition is understood to vary, depending on the particular composition application, and can be zero when a clear composition is desired. For example, a coating composition may comprise up to about 300 wt %, for example about 50 to about 200 wt % of pigment based on the solids content of the alkyd resin (pigment/binder), preferably up to 100 wt % of pigment based on the solids content of the alkyd resin. Depending on the particular end use, a preferred composition may comprise approximately 0 to 100 wt % of pigment based on the solids content of the alkyd resin.

The solvent-borne coating compositions of the present invention may include other additives, e.g. catalysts, other pigments and pigment pastes, wetting agents, thixotropic agents, anti-sagging agents, anti-oxidants, antifouling agents, bactericides, fungicides, algaecides, antisettling agents, insecticides, antifoaming agents slip agents, flow and leveling agents, rheological modifiers, photo-initiators, UV-absorbers, HALS-radical scavengers, corrosion inhibitors, matting agents, waxes, mineral oils, flame retardants, loss of dry inhibitors, optical brighteners, adhesion promoters, diluents, elastomers, plasticizers, air release agents, absorbents, anti-crater additives, reinforcing agents, dispersing aids, plasticizers, substrate wetting agents, odorants, electroconductive additives, corrosion inhibitors and corrosion-inhibitive pigments, additional hardeners and additional curable compounds, depending on the application. Certain embodiments of the coating compositions of the present invention include surface active agents include, such as any of the well known anionic, cationic or nonionic surfactants or dispersing agents. Examples of suitable additives that may be added to the coating composition may be found in Additives Guide, Paint & Coatings Magazine, May 2006, hereby incorporated by reference. If desired, other resinous materials can be utilized in conjunction with the aforementioned alkyd resins.

The coating composition according to the invention can be formulated as paints, stains, varnishes, enamels, printing ink and similar compositions which contain oxidizable alkyd binders.

The coating compositions of the present invention can be applied to various substrates including wood, paper, foam, and synthetic materials (such as plastics including elastomeric substrates), leather, textiles, glass, ceramic, metals (such as iron, steel and aluminium), concrete, cement, brick, and the like.

As a result, the present invention is also directed to substrates at least partially coated with at least one coating composition of the present invention. The substrates may be pre-treated before application of the at least one coating composition. The substrates may be post-treated after application of the at least one coating composition, with any other compositions.

Any known method can be used to apply the coating compositions of the invention to a substrate. Non-limiting examples of such application methods are spreading (e.g., with paint pad or doctor blade, or by brushing or rolling), spraying (e.g., air-fed spray, airless spray, hot spray, and electrostatic spray), flow coating (e.g., dipping, curtain coating, roller coating, and reverse roller coating), and electrodeposition. (See generally, R. Lambourne, Editor, Paint and Surface Coating: Theory and Practice, Eilis Horwood, 1987, page 39 et seq.)

The coating compositions of the present invention can be applied and fully cured at ambient temperature conditions in the range of from about −10° C. to 50° C. Curing of said polymer composition according to the invention typically can proceed very rapidly, and in general can take place at a temperature within the range of from −10° C. to +50° C., in particular from 0° C. to 40° C., more in particular from 3 to 25° C. However, compositions of the present invention may be cured by additional heating.

The coating compositions of the present invention may be used as a single coating, a top coating, a base coating in a two-layered system, or one or more layers of a multi-layered system including a clear top coating composition, colorant layer and base coating composition, or as a primer layer. A typical opaque system may comprise: 1 or 2 layers primer and 1 or 2 layers of top coat (a total of 3 layers). Alternative opaque system may comprise: 1 primer layer, 1 layer of mid coat and 1 layer top coat. Example of transparent systems may comprise 1 layer of impregnant and 3 layers of top coats or 3 layers of top coat for maintenance work.

The compositions according to the present invention showed improved low temperature drying and drying stability when compared to reference compositions. The through drying of coating composition according to the present invention, in particular of coating composition containing Co/V/Zr/Ca, was more homogeneous when compared to reference compositions (See example 4, Table 4, the early through dry measured for the composition according to an embodiment of the invention).

The invention will be more readily understood by reference to the following examples, which are included merely for purposes of illustration of certain aspects and embodiments of the present invention and are not intended to limit the invention.

EXAMPLES

Four examples are described hereunder illustrating the effect of the compositions according to embodiments of the present invention on the low temperature drying and drying stability.

Unless otherwise indicated, all parts and all percentages in the following examples, as well as throughout the specification, are parts by weight or percentages by weight respectively.

The V-driers used were: Borchers VP0132 (examples 1 and 2, this drier contains 5% of V) and Cur-RX E (examples 3 and 4, this drier contains 4% of V).

The following test methods were used to evaluate the films and coatings prepared according to embodiments of the present invention.

The drying stages of the paint formulations were assessed using a BK-drying recorder (Sheen Instruments Ltd). A wet paint layer was cast on a glass strip of 30.5×2.5 cm by using a sheen cube with a gap size of 150 μm. A vertical blunt needle was positioned into the freshly applied film loaded by 5 g of brass and then dragged through the drying paint at a speed of 24.4 mm/h in a direction parallel to the length of the coat. The drying times were measured in terms of four stages, defined as follows:

Run back: the film flows back together when the stylus moves through it and no groove is formed. This phase is characterized by the evaporation of the solvent from the paint.

Continuous track: the film is starting to set up. It does not flow back together after the stylus moves through it bringing about a groove in the film. In this stage, the viscosity of the pain film has substantially increased. This phase ends when the point of "start of gel tear" is reached.

Gel tear: The stylus rips the surface skin of the film. The film is starting to surface dry but is not through dry.

Surface trace: The stylus leaves a mark on the surface of the film. The phase is characterized by that the film is starting to through dry.

Drying times were also assessed in the following manner. The test composition is cast on a glass plate by using a draw bar with a gap size of 75 μm.

Dust-free: The coating is considered dust-free if it does not pull fibers when a wad of cotton is blown gently of a drying film in a horizontal direction.

Tack-free: The coating is considered tack free if it does not pull fibers when a wad of cotton is placed on the drying film with a load of 1 kg/3 cm$^2$ for 10 seconds and afterwards blown gently away in a horizontal direction.

Through-dry: The coating is considered through dry if it is not affected pressing and twisting by the thumb with a load of 7 kg on the surface of the film.

Example 1

An enamel according to an embodiment of the present invention was prepared by mixing together the constituents listed in Table 1.

TABLE 1

| Constituents | Parts by weight |
|---|---|
| silicone modified alkyd (80% non-volatile material (nvm)) | 62.4 |
| calcium (5%) drier | 2.7 |
| zirconium (18%) drier | 3.0 |
| cobalt (10%) drier | 0.3 |
| 2,2'-bipyridyl | 0.1 |
| defoamer | 0.3 |
| anti-skinning agent | 0.5 |
| rheology modifier | 0.4 |
| polydimethyl siloxane | 0.1 |
| white alkyd colorant | 16.5 |
| black alkyd colorant | 9.8 |
| high boiling aliphatic hydrocarbon solvent | 4.0 |
| total | 100.0 |

To a portion of the enamel was added 0.4% of a vanadium (5%) drier and the drying performance was weighed against to that of a comparative formulation prepared as described above but without the vanadium based drier. The test compositions were aged overnight before the drying performance was evaluated.

The results are shown in Table 2.

TABLE 2

|  | Enamel containing the drier system Co/V/Zr/Ca | Comparative example containing the drier system Co/Zr/Ca |
|---|---|---|
| Initial drying times (hours:minutes) at 23° C./50% RH | | |
| run back | 1:45 | 2:00 |
| start of gel tear | 1:45 | 2:00 |
| end of gel tear | 11:00 | 12:30 |
| end of surface trace | 14:00 | 14:00 |
| Initial drying times (hours:minutes) at 5° C./85% RH | | |
| run back | 5:45 | 10:30 |
| start of gel tear | 6:45 | 10:30 |
| end of gel tear | 16:15 | >24:00 |
| end of surface trace | 21:00 | >24:00 |
| Drying times after aging at 40° C. for 6 weeks (hours:minutes) at 5° C./85% RH | | |
| run back | 5:30 | 12:00 |
| start of gel tear | 6:30 | 12:00 |
| end of gel tear | 19:00 | >24:00 |
| end of surface trace | 21:15 | >24:00 |

Table 2 shows the effect of the presence of V in a dark colored silicone alkyd on the initial low temperature drying and drying stability.

Example 2

A typical base paint without metal driers was prepared by mixing together the constituents listed in Table 3.

TABLE 3

| Constituents | Parts by weight |
|---|---|
| silicone modified alkyd (80% nvm) | 67.6 |
| defoamer | 0.3 |
| anti-skinning agent | 0.6 |
| rheology modifier | 0.4 |

TABLE 3-continued

| Constituents | Parts by weight |
|---|---|
| polydimethyl siloxane | 0.1 |
| white alkyd colorant | 16.5 |
| black alkyd colorant | 10.0 |
| High boiling aliphatic hydrocarbon solvent | 4.5 |
| total | 100.0 |

To portions of the base paint were added either a drier system according to an embodiment of the present invention or a comparative drier system. The test compositions were aged overnight before the drying performance was evaluated. The results are shown in Table 4.

TABLE 4

|  | Enamel containing the drier system Co/V/Zr/Ca parts by weight | Comparative example containing the drier system Co/V/Zr | Comparative example containing the drier system Co/V | Comparative example containing the drier system V/Zr/Ca |
|---|---|---|---|---|
| base paint | 103.3 | 103.3 | 103.3 | 103.3 |
| calcium (5%) drier | 3.6 |  |  | 3.6 |
| zirconium (18%) drier | 4.1 | 4.1 |  | 4.1 |
| cobalt (10%) drier | 0.4 | 0.4 | 0.4 |  |
| vanadium (5%) drier | 0.4 | 0.4 | 0.4 | 0.4 |
| Initial drying times (hours:minutes) at 23° C./50% RH | | | | |
| run back | 2:00 | 2:30 | 4:00 | 15:30 |
| start of gel tear | 2:00 | 2:30 | 4:30 | >24:00 |
| end of gel tear | 17:30 | 12:15 | 18:15 | >24:00 |
| end of surface trace | 17:30 | 14:30 | 18:15 | >24:00 |
| Initial drying times (hours:minutes) at 5° C./85% RH | | | | |
| run back | 4:45 | 5:15 | 7:15 | 8:30 |
| start of gel tear | 6:00 | 9:45 | 20:00 | >24:00 |
| end of gel tear | 11:30 | 16:45 | >24:00 | >24:00 |
| end of surface trace | 17:15 | >24:00 | >24:00 | >24:00 |
| Initial drying times (hours:minutes) at 5° C./85% RH | | | | |
| dust-free | 6:00 | >9:00 | >9:00 | >24:00 |
| tack-free | 7:45 | >9:00 | >9:00 | >24:00 |
| through-dry | 9.00 | 24.00 | >24.00 | >24.00 |

The results of Table 4, shows that optimal results are obtained with composition comprising the primary driers Co and V, the co-ordination Zr drier and the secondary Ca drier.

Example 3

A typical base paint without metal driers was prepared by grinding in a bead mill and mixing together the constituents listed in Table 5. The PU modified alkyds used in examples 3 and 4 are mixtures of long oil unmodified alkyds and PU-modified alkyds.

TABLE 5

| Constituents | Parts by weight |
|---|---|
| PU-modified alkyd binder (83% nvm) | 60.0 |
| defoamer | 0.2 |
| anti-skinning agent | 0.4 |

TABLE 5-continued

| Constituents | Parts by weight |
| --- | --- |
| organically modified bentonite | 0.2 |
| dispersant | 1.1 |
| silicon dioxide amorphous | 4.0 |
| polyethylene wax | 0.7 |
| polydimethyl siloxane | 0.1 |
| white alkyd colorant | 14.7 |
| black alkyd colorant | 9.5 |
| high boiling aliphatic hydrocarbon solvent | 9.1 |
| total | 100.0 |

To portions of the base paint were added either a drier system according to embodiment of the present invention or a comparative drier system. As loss of dry inhibitor, two compositions were evaluated next to the drier system according to an embodiment of the invention: 1.25 times the standard amount of metal driers and a cobalt drier in a suspension of finely divided diatomaceous earth.

The test compositions were aged overnight before the drying performance was evaluated. The results are shown in Table 6.

TABLE 6

| | Enamel containing the drier system Co/V/Zr/Ca | Comparative example containing the drier system Co/Zr/Ca | Comparative example containing the drier system Co/Zr/Ca (1.25 times the standard amount) | Comparative example containing the drier system Co/Zr/Ca and a cobalt based loss of dry inhibitor |
| --- | --- | --- | --- | --- |
| | Parts by weight | | | |
| base paint | 100.0 | 100.0 | 100.0 | 100.0 |
| calcium drier (5%) | 3.0 | 3.0 | 4.0 | 3.0 |
| zirconium drier (18%) | 1.6 | 1.6 | 2.2 | 1.6 |
| cobalt (2%) zirconium (13%) drier | 1.1 | 1.1 | 1.5 | 1.1 |
| vanadium drier (4%) | 2.0 | | | |
| Loss-of-dry inhibitor* | | | | 0.5 |
| Initial drying times (hours:minutes) at 5° C./85% RH | | | | |
| run back | 4:30 | 7:00 | 6:30 | 6:00 |
| start of gel tear | 5:45 | 8:30 | 7:00 | 6:30 |
| end of gel tear | 7:15 | 10:00 | 8:30 | 9:00 |
| end of surface trace | 7:45 | 10:45 | 9:00 | 9:30 |
| Drying times after aging at 40° C. for 6 weeks (hours:minutes) at 5° C./85% RH | | | | |
| run back | 6:15 | 14:30 | 11:00 | 8:30 |
| start of gel tear | 7:30 | 15:15 | 11:30 | 8:45 |
| end of gel tear | 9:00 | 18:30 | 14:45 | 11:30 |
| end of surface trace | 9:30 | 19:30 | 15:15 | 12:30 |

*The loss-of dry inhibitor was Troy Perma Dry, which is a Co-soap precipitated on diatomaceous earth.

Table 6 shows that the drier system comprising Co/V/Zr/Ca also works in a dark colored urethane modified alkyd and that this combination outperforms a cobalt feeder (state of the art loss-of-dry inhibitor) and 1.25 times the standard concentrations of Co/Zr/Ca (overdosing is a form of a sacrificial drier).

Example 4

A typical base paint without metal driers was prepared by grinding in a bead mill and mixing the constituents listed in Table 7 together.

TABLE 7

| Constituents | Parts by weight |
| --- | --- |
| PU-modified alkyd binder (77% nvm) | 62.0 |
| defoamer | 0.2 |
| anti-skinning agent | 0.4 |
| dispersant | 1.3 |
| titanium dioxide | 24.6 |
| polydimethyl siloxane | 0.1 |
| calcium (5%) drier | 3.5 |
| zirconium (18%) drier | 1.2 |
| cobalt (2%) zirconium (13%) drier | 1.1 |
| high boiling aliphatic hydrocarbon solvent | 5.6 |
| total | 100.0 |

To a portion of the base paint was added 0.25% of a vanadium (4%) drier and the drying performance was weighed against to that of the comparative formulation without a vanadium based drier. The test compositions were aged overnight before the drying performance was evaluated. The results are shown in Table 8.

TABLE 8

| | Enamel containing the drier system Co/V/Zr/Ca | Comparative example containing the drier system Co/Zr/Ca |
| --- | --- | --- |
| Initial drying times (hours:minutes) at 5° C./85% RH | | |
| run back | 2:00 | 2:00 |
| start of gel tear | 5:00 | 7:00 |
| end of gel tear | 8:30 | 13:00 |
| end of surface trace | 11:30 | 15:30 |
| Drying times after aging at 40° C. for 4 weeks (hours:minutes) at 5° C./85% RH | | |
| run back | 1:30 | 3:00 |
| start of gel tear | 4:30 | 10:00 |
| end of gel tear | 7:00 | 16:00 |
| end of surface trace | 10:00 | 17:00 |

Table 8 shows that the metal combination Co/V/Zr/Ca is also beneficial in a white pigmented formulation of which the pigment loading is higher compared to the dark colored formulations.

What is claimed is:

1. A coating composition comprising:
at least one autoxidizable alkyd binder and a drier system, wherein the drier system comprises:
a) at least 0.001 wt % metal, based on binder solids, of at least one V salt of an organic acid;
b) at least 0.01 wt % metal, based on binder solids, of at least one Co salt of an organic acid;
c) at least 0.1 wt % metal, based on binder solids, of at least one metal salt of an organic acid wherein the metal is Ca;

and wherein said composition is a solvent borne coating composition, and wherein the drier system further comprises at least 0.01 wt % metal, based on binder solids, of at least one metal salt of an organic acid wherein the metal is selected from the group consisting of Zr and Sr.

2. The coating composition according to claim 1, wherein the drier system comprises:
   a) from 0.001 wt % to 2 wt % metal, based on binder solids, of at least one V salt of an organic acid,
   b) from 0.01 wt % to 2 wt % metal, based on binder solids, of at least one Co salt of an organic acid; and
   c) from 0.1 wt % to 2 wt % metal, based on binder solids, of at least one metal salt of an organic acid wherein the metal is Ca.

3. The coating composition according to claim 1, wherein the drier system comprises from 0.01 wt % to 2 wt % metal, based on binder solids, of at least one metal salt of an organic acid wherein the metal is selected from the group consisting of Zr and Sr.

4. The composition according to claim 1, wherein the organic acid is selected from the group consisting of saturated and unsaturated aliphatic, aromatic or alicyclic monocarboxylic acid.

5. The coating composition according to claim 1, wherein said at least one autoxidizable alkyd binder is present in an amount of from about 20 to about 98 wt %, based on the total composition.

6. The coating composition according to claim 1, wherein said at least one autoxidizable alkyd binder is a medium or long oil unmodified alkyd, a silicone modified alkyd, a polyurethane modified alkyd, or combination thereof.

7. The coating composition according to claim 1, further comprising at least one solvent in an amount of about 5 wt % to about 45 wt % based on the total weight of the coating composition.

8. The coating system composition according to claim 1, wherein said composition has a VOC of less than 400 g/L.

9. A substrate having applied thereon a cured coating composition according to claim 1.

10. The coating composition according to claim 1, wherein the drier system further comprises at least 0.01 wt % metal, based on binder solids, of at least one metal salt of an organic acid wherein the metal is Zr.

11. The coating composition according to claim 1, wherein the drier system further comprises at least 0.4 wt % metal, based on binder solids, of at least one metal salt of an organic acid wherein the metal is Zr.

12. The coating composition according to claim 1, wherein the drier composition comprises:
   a) at least 0.01 wt % metal, based on binder solids, of at least one V salt of an organic acid;
   b) at least 0.02 wt % metal, based on binder solids, of at least one Co salt of an organic acid;
   c) at least 0.1 wt % metal, based on binder solids, of at least one metal salt of an organic acid wherein the metal is Ca; and
   d) at least 0.1 wt % metal, based on binder solids, of at least one metal salt of an organic acid wherein the metal is selected from the group consisting of Zr and Sr.

13. The coating composition according to claim 1, wherein the drier composition comprises:
   a) from 0.01 wt % to 1.0 wt % metal, based on binder solids, of at least one V salt of an organic acid;
   b) from 0.02 wt % to 0.5 wt % metal, based on binder solids, of at least one Co salt of an organic acid;
   c) from 0.1 wt % to 1.5 wt % metal, based on binder solids, of at least one metal salt of an organic acid wherein the metal is Ca; and
   d) from 0.1 wt % to 1.5 wt % metal, based on binder solids, of at least one metal salt of an organic acid wherein the metal is selected from the group consisting of Zr and Sr.

14. The coating composition according to claim 1, wherein the drier composition comprises:
   a) from 0.01 wt % to 1.0 wt % metal, based on binder solids, of at least one V salt of an organic acid;
   b) from 0.02 wt % to 0.5 wt % metal, based on binder solids, of at least one Co salt of an organic acid;
   c) from 0.1 wt % to 1.5 wt % metal, based on binder solids, of at least one metal salt of an organic acid wherein the metal is Ca; and
   d) from 0.1 wt % to 1.5 wt % metal, based on binder solids, of at least one metal salt of an organic acid wherein the metal is Zr.

* * * * *

UNITED STATES PATENT AND TRADEMARK OFFICE
CERTIFICATE OF CORRECTION

PATENT NO. : 9,045,665 B2
APPLICATION NO. : 13/256755
DATED : June 2, 2015
INVENTOR(S) : John Weijnen et al.

It is certified that error appears in the above-identified patent and that said Letters Patent is hereby corrected as shown below:

Title Page, (item 73, Assignee) at line 1, Change "Uithoom" to --Uithoorn--.

In the Specification

In column 2 at line 60, Change "comprises" to --comprises:--.

In column 4 at line 6, Change "wt." to --wt--.

In column 5 at line 48, Change "comprises/a)" to --comprises:--.

In column 5 at line 62, Change "comprises" to --comprises:--.

In column 8 at line 3, Change "isoparafins;" to --isoparaffins;--.

In column 8 at lines 10-12, Change "ShellIsol H, ShellIsol K, ShellIsol D40, ShellIsol D60, ShellIsol D70, and ShellIsol AB," to --Shellsol H, Shellsol K, Shellsol D40, Shellsol D60, Shellsol D70, and Shellsol AB,--.

In column 8 at line 25, Change "g/I," to --g/l,--.

In column 8 at line 26, Change "g/I." to --g/l.--.

In column 9 at line 57, Change "impregnant" to --impregnate--.

In the Claims

In column 15 at line 35, In Claim 8, after "coating" delete "system".

In column 15 at line 42, In Claim 10, change "acid" to --acid,--.

In column 16 at line 4, In Claim 11, change "acid" to --acid,--.

Signed and Sealed this
Twelfth Day of April, 2016

Michelle K. Lee
*Director of the United States Patent and Trademark Office*